(12) United States Patent
Zhang et al.

(10) Patent No.: US 12,199,726 B2
(45) Date of Patent: Jan. 14, 2025

(54) NETWORK NODE, TERMINAL DEVICE AND METHODS THEREIN FOR DATA TRANSMISSION USING BEAMFORMING

(71) Applicant: Telefonaktiebolaget LM Ericsson (publ), Stockholm (SE)

(72) Inventors: Qi Zhang, Beijing (CN); Wei Zhou, Beijing (CN); Chunhui Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 17/769,473

(22) PCT Filed: Oct. 18, 2019

(86) PCT No.: PCT/CN2019/111910
§ 371 (c)(1),
(2) Date: Apr. 15, 2022

(87) PCT Pub. No.: WO2021/072735
PCT Pub. Date: Apr. 22, 2021

(65) Prior Publication Data
US 2023/0146581 A1    May 11, 2023

(51) Int. Cl.
*H04B 7/06* (2006.01)
*H04W 24/10* (2009.01)

(52) U.S. Cl.
CPC ......... *H04B 7/0695* (2013.01); *H04B 7/0626* (2013.01); *H04B 7/0639* (2013.01); *H04W 24/10* (2013.01)

(58) Field of Classification Search
None
See application file for complete search history.

(56) References Cited

U.S. PATENT DOCUMENTS

| 11,317,306 B2* | 4/2022 | Wei ..................... H04B 7/0647 |
| 2015/0222340 A1* | 8/2015 | Nagata ................ H04L 25/0224 |
| | | 375/267 |

(Continued)

FOREIGN PATENT DOCUMENTS

| CN | 107438957 A | 12/2017 |
| CN | 107466461 A | 12/2017 |

(Continued)

OTHER PUBLICATIONS

3GPP, "3rd Generation Partnership Project; Technical Specification Group Radio Access Network; NR; Multiplexing and channel coding (Release 15)", 3GPP TS 38.212 V15.1.0, Mar. 2018, 1-94.

(Continued)

*Primary Examiner* — Otis L Thompson, Jr.
(74) *Attorney, Agent, or Firm* — Murphy, Bilak & Homiller, PLLC

(57) ABSTRACT

The present disclosure provides a method (200) in a network node. The method (200) includes: selecting (210) a number, N, of beams for data transmission to a terminal device, where N is an integer larger than one; transmitting (220) to the terminal device Channel State Information-Reference Signal, CSI-RS, having N ports using the N beams; receiving (230) from the terminal device a first measurement report containing a Rank Indicator, RI, obtained by the terminal device measuring the CSI-RS; and transmitting (240) data to the terminal device based on the RI using the N beams.

14 Claims, 8 Drawing Sheets

(56) References Cited

U.S. PATENT DOCUMENTS

| | | | |
|---|---|---|---|
| 2015/0295626 A1* | 10/2015 | Zhao | H04B 7/0639 |
| | | | 375/267 |
| 2017/0149480 A1* | 5/2017 | Kakishima | H04B 7/024 |
| 2018/0205438 A1* | 7/2018 | Davydov | H04B 7/0626 |
| 2018/0241454 A1 | 8/2018 | Lee et al. | |
| 2019/0052330 A1 | 2/2019 | Kim et al. | |
| 2019/0149211 A1 | 5/2019 | Nilsson et al. | |
| 2019/0182697 A1 | 6/2019 | Zhang et al. | |
| 2019/0319688 A1* | 10/2019 | Sun | H04B 7/088 |
| 2020/0036472 A1* | 1/2020 | Kim | H04L 5/0051 |
| 2020/0204234 A1* | 6/2020 | Zhu | H04W 52/0229 |

FOREIGN PATENT DOCUMENTS

| | | |
|---|---|---|
| CN | 107615856 A | 1/2018 |
| CN | 108141267 A | 6/2018 |
| CN | 108401264 A | 8/2018 |
| CN | 109155655 A | 1/2019 |
| CN | 109792620 A | 5/2019 |
| WO | 2016157059 A1 | 10/2016 |

OTHER PUBLICATIONS

3GPP, "3rd Generation Partnership Project; Technical Specification Group Radio Access Network; NR; Physical layer procedures for control (Release 15)", 3GPP TS 38.213 V15.1.0, Mar. 2018, 1-77.

3GPP, "3rd Generation Partnership Project; Technical Specification Group Radio Access Network; NR; Physical layer procedures for data (Release 15)", 3GPP TS 38.214 V15.1.0, Mar. 2018, 1-77.

3GPP, "3rd Generation Partnership Project; Technical Specification Group Radio Access Network; NR; Radio Resource Control (RRC) protocol specification (Release 15)", 3GPP TS 38.331 V15.6.0, Jun. 2019, 1-519.

* cited by examiner

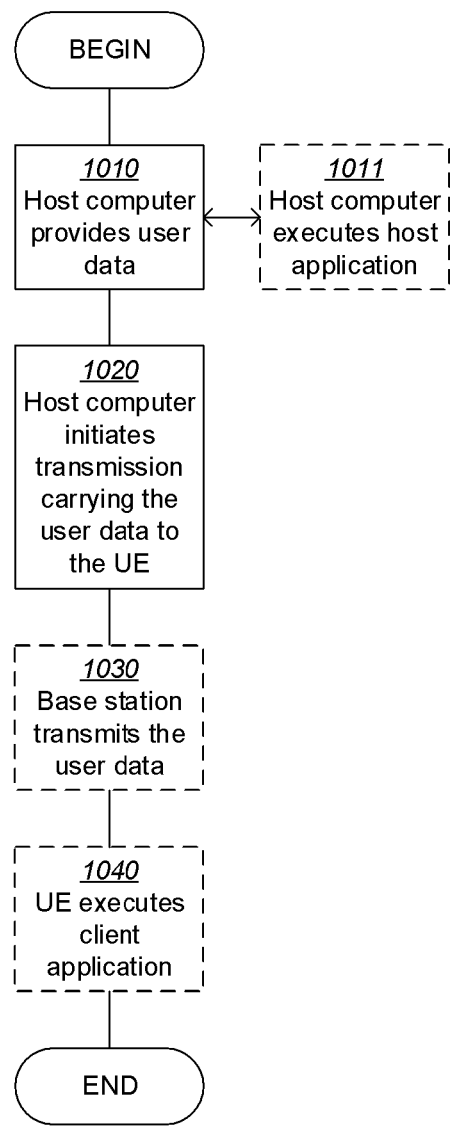
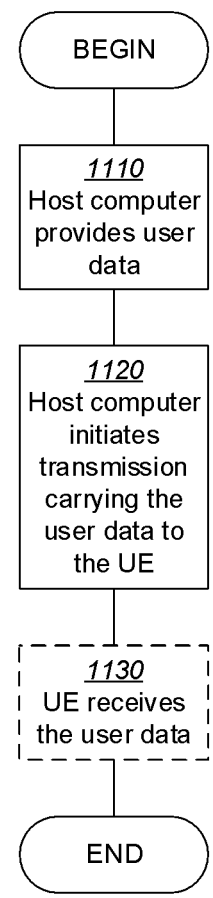
FIG. 10
FIG. 11

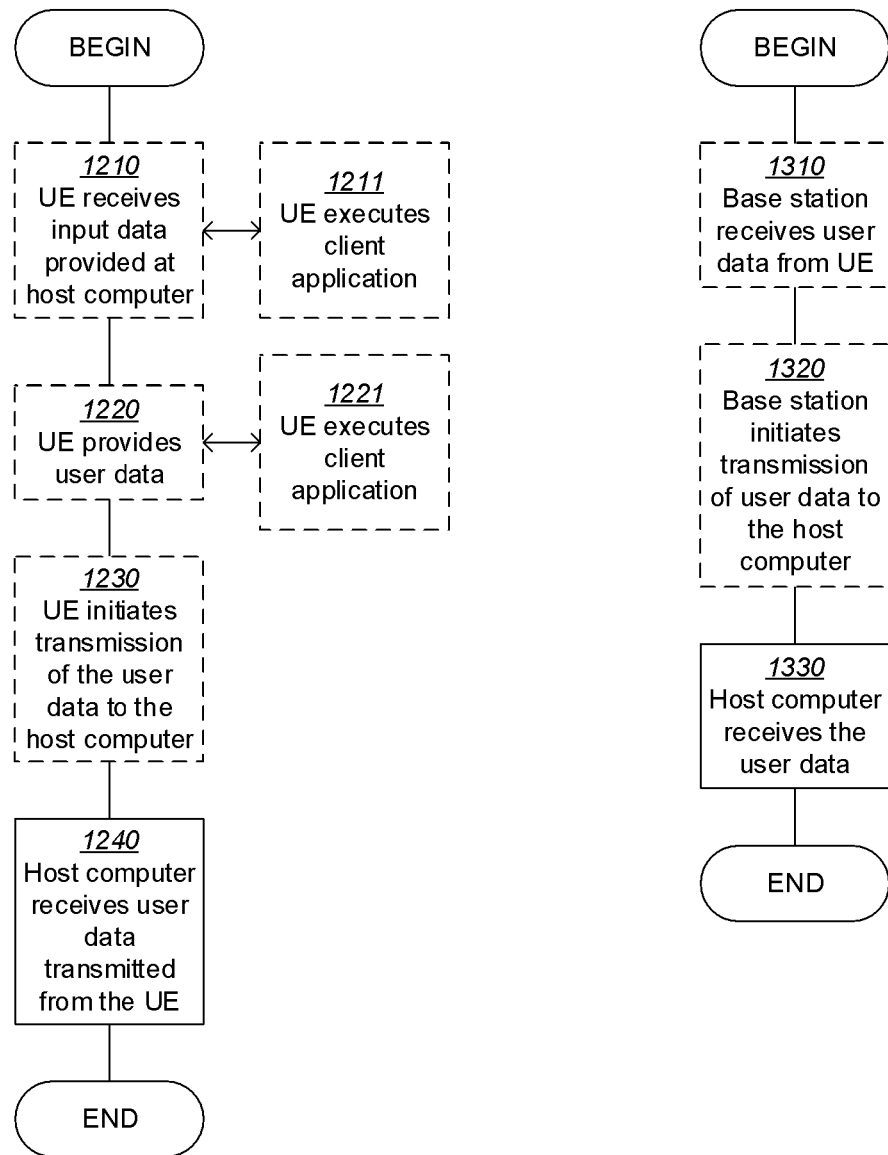

NETWORK NODE, TERMINAL DEVICE AND METHODS THEREIN FOR DATA TRANSMISSION USING BEAMFORMING

TECHNICAL FIELD

The present disclosure relates to wireless communication, and more particularly, to a network node, a terminal device and methods therein for data transmission using beamforming.

BACKGROUND

The 5th Generation (5G) mobile communications need frequency bands at different carrier frequencies in order to meet different requirements. For example, low frequency bands will be needed for achieving a large coverage and higher frequency bands (e.g., in the millimeter wave (mmW) region, i.e., near and above 30 GHz) will be needed for providing a desired capacity. At high frequencies, problems associated with propagation properties of radio signals become more challenging, and beamforming at network nodes (e.g., (next) generation NodeBs, or gNBs) and/or terminal devices (e.g., User Equipments, or UEs) may be required to provide a sufficient link budget.

In order to facilitate transmissions with beamforming, a set of procedures referred to as beam management has been standardized for New Radio (NR) in the $3^{rd}$ Generation Partnership Project (3GPP) Technical Specification (TS) 38.212, V15.1.0, TS 38.213, V15.1.0, and TS 38.214, V15.1.0. Typically, a Grid of Beam (GoB) system is used for data transmission. To achieve a good performance for a GoB system, a number of narrow beams can be predefined for beam sweeping.

FIG. 1 shows an example of a GoB system, in which predefined beams cover 120 degrees (−60 to 60 degrees) horizontally, with each narrow beam covering about 5 degrees horizontally and about 6 degrees vertically.

The basic procedures for beam management include:
 (a) Beam Sweeping, in which a gNB configures a UE to measure on a set of beamformed System Information and Synchronization Signal Blocks (SSBs)/Channel State Information-Reference Signals (CSI-RSs) transmitted by the gNB;
 (b) Beam Measurement, in which the UE measures Reference Signal Received Power (RSRP) of the SSBs/CSI-RSs;
 (c) Beam Reporting, in which the UE indicates a preferred transmission beam from the gNB by reporting one or more (e.g., up to four) SSB indices/CSI-RS Resource Indicators (CRIs) and their associated RSRP to the gNB (according to TS 38.331, V15.6.0, the UE can be configured to report Channel Quality Indicator (CQI), Precoding Matrix Index (PMI), and/or Rank Indicator (RI) as well);
 (d) Beam Determination, in which the gNB determines a preferred beam according to the report from the UE for data transmission in a GoB system; and
 (e) Beam Failure Recovery, in which the UE detects SSBs/CSI-RSs in case of beam failure and triggers a random access procedure for failure recovery.

SUMMARY

In the above procedures, for example, a one-port CSI-RS can be configured for each predefined beam and a UE can report the RSRP of one or more best beams to a gNB. The gNB can transmit data, e.g., via Physical Downlink Shared Channel (PDSCH), to the UE via one or more beams selected from the best beams. In this case, a multi-layer transmission to the UE can be achieved by splitting antennas. That is, all PDSCH data layers can be transmitted while sharing the selected beam(s). Assuming that the gNB has 64 transmission antennas and only one predefined beam is selected for data transmission, the beam weight, i.e., a Port-to-Antenna (P2A) mapping weight, of the selected beam can be represented as $W^{P2A}$, which is a 64*1 vector, and the split weight for a rank-4 transmission can be:

$$\begin{bmatrix} W^{P2A} & \cdots & 0 \\ \vdots & \ddots & \vdots \\ 0 & \cdots & W^{P2A} \end{bmatrix},$$

which is a 64*4 matrix.

However, in this case, only some of the transmission antennas can be used for each data layer and, as a result, the beam for transmission will be wider when compared with the case in which all transmission antennas are used for one data layer. This would lead to a significant drop in the beamforming gain. Moreover, the rank can only be 1 as the one-port CSI-RS is measured. Accordingly, without any RI reported from the UE, it is difficult for the gNB to estimate an optimal rank for data transmission.

As an alternative, a gNB may configure each predefined beam with a multi-port (e.g., N-port, where N is an integer larger than 1) CSI-RS and configured a UE to report CQI, PMI and/or RI. In this case, the gNB can transmit data, e.g., via PDSCH to the UE based on the reported PMI and/or RI using one or more selected beams. Assuming that the gNB has 64 transmission antennas and only one predefined beam is selected for data transmission, the beam weight for data transmission can be $W^{P2A}*W^{PMI}$ wherein $W^{P2A}$ is a 64*N P2A mapping matrix and $W^{PMI}$ is an N*RI precoding matrix.

However, for each CSI-RS resource set, the UE can report the RSRP of e.g., up to four beams but only one best CQI/PMI/RI. Each CSI-RS resource in a CSI-RS resource set is associated with one CSI-RS (and thus one beam), and the size of the CSI-RS resource set, i.e., the number of CSI-RS resources in the set, is limited to e.g., 16 when the UE is configured to report CQI/PMI/RI (as opposed to e.g., 64 when the UE is configured to report RSRP only). This would result in a lack of flexibility for the gNB in selecting predefined beams, especially for multi-layer transmissions. One straightforward solution would be to configure only one CSI-RS in each CSI-RS resource set, but this would be inefficient.

It is an object of the present disclosure to provide a network node, a terminal device and methods therein for data transmission using beamforming.

According to a first aspect of the present disclosure, a method in a network node is provided. The method includes: selecting a number, N, of beams for data transmission to a terminal device, where N is an integer larger than one; transmitting to the terminal device a CSI-RS having N ports using the N beams; receiving from the terminal device a first measurement report containing an RI obtained by the terminal device measuring the CSI-RS; and transmitting data to the terminal device based on the RI using the N beams.

In an embodiment, the method may further include: configuring the terminal device to: measure the CSI-RS, and report the RI or report the RI and a PMI.

In an embodiment, the method may further include: transmitting to the terminal device a number, M, of CSI-RSs each having one port and being associated with one of M beams, where M is an integer and MN; and receiving from the terminal device a second measurement report indicating a number, m, of CSI-RSs having best signal qualities among the M CSI-RSs, where m is an integer.

In an embodiment, the above operation of selecting may include: selecting the N beams from the M beams based on the m CSI-RSs.

In an embodiment, the above operation of selecting may include: selecting the N beams each associated with one of the m CSI-RSs that has a signal quality higher than a threshold.

In an embodiment, the M CSI-RSs can be transmitted in one CSI-RS resource set. The method may further include: configuring the terminal device to measure the M CSI-RSs and report the m CSI-RSs having best signal qualities among the M CSI-RSs, without reporting PMI or RI.

In an embodiment, the method may further include: transmitting, when each of the m CSI-RSs has a signal quality higher than a threshold, to the terminal device M-m CSI-RSs obtained by removing the m CSI-RSs from the M CSI-RSs; and receiving from the terminal device a third measurement report indicating a number, k, of CSI-RSs having best signal qualities among the M-m CSI-RSs, where k is an integer. The above operation of selecting may include: selecting, as the N beams, m beams each associated with one of the m CSI-RSs and one or more beams each associated with one of the k CSI-RSs that has a signal quality higher than the threshold.

In an embodiment, the M-m CSI-RSs can be transmitted in one CSI-RS resource set. The method may further include: configuring the terminal device to measure the M-m CSI-RSs and report the k CSI-RSs having best signal qualities among the M-m CSI-RSs, without reporting PMI or RI.

In an embodiment, the signal quality may include RSRP.

In an embodiment, the N beams may be selected based on a minimum allowable spatial or angular distance between any two beams for the data transmission.

In an embodiment, the above operation of transmitting may include: transmitting, when the first measurement report further contains a PMI, the data with a precoding matrix based on the PMI and the RI, or transmitting, when the first measurement report contains no PMI, the data based on the RI.

In an embodiment, the method may further include: selecting a number, P, of beams for data transmission to another terminal device, where P is an integer larger than one. The N beams and the P beams may be selected based on a minimum allowable spatial or angular distance between any beam for the data transmission to the terminal device and any beam for the data transmission to the other terminal device.

According to a second aspect of the present disclosure, a network node is provided. The network node includes a selecting unit configured to select a number, N, of beams for data transmission to a terminal device, where N is an integer larger than one; a transmitting unit configured to transmit to the terminal device a CSI-RS having N ports using the N beams; and a receiving unit configured to receive from the terminal device a first measurement report containing an RI obtained by the terminal device measuring the CSI-RS. The transmitting unit is further configured to transmit data to the terminal device based on the RI using the N beams.

According to a third aspect of the present disclosure, a network node is provided. The network node includes a transceiver, a processor and a memory. The memory contains instructions executable by the processor whereby the network node is operative to perform the method according to the above first aspect.

According to a fourth aspect of the present disclosure, a computer readable storage medium is provided. The computer readable storage medium has computer program instructions stored thereon. The computer program instructions, when executed by a processor in a network node, cause the network node to perform the method according to the above first aspect.

According to a fifth aspect of the present disclosure, a method in a terminal device is provided. The method includes: receiving a CSI-RS having a number, N, of ports transmitted from a network node using N beams, where N is an integer larger than one; transmitting to the network node a first measurement report containing an RI obtained by measuring the CSI-RS; and receiving data transmitted from the network node based on the RI using the N beams.

In an embodiment, the method may further include: receiving from the network node a first configuration signal for configuring the terminal device to: measure the CSI-RS, and report the RI or report the RI and a PMI.

In an embodiment, the method may further include: receiving from the network node a number, M, of CSI-RSs each having one port and being associated with one of M beams, where M is an integer and M≥N; and transmitting to the network node a second measurement report indicating a number, m, of CSI-RSs having best signal qualities among the M CSI-RSs, where m is an integer.

In an embodiment, the M CSI-RSs may be received in one CSI-RS resource set. The method may further include: receiving from the network node a second configuration signal for configuring the terminal device to measure the M CSI-RSs and report the m CSI-RSs having best signal qualities among the M CSI-RSs, without reporting PMI or RI.

In an embodiment, the method may further include: receiving from the network node M-m CSI-RSs obtained by removing the m CSI-RSs from the M CSI-RSs; and transmitting to the network node a third measurement report indicating a number, k, of CSI-RSs having best signal qualities among the M-m CSI-RSs, where k is an integer.

In an embodiment, the M-m CSI-RSs may be received in one CSI-RS resource set. The method may further include: receiving from the network node a third configuration signal for configuring the terminal device to measure the M-m CSI-RSs and report the k CSI-RSs having best signal qualities among the M-m CSI-RSs, without reporting PMI or RI.

In an embodiment, the signal quality may include RSRP.

In an embodiment, when the first measurement report further contains a PMI, the data may be transmitted from the network node with a precoding matrix based on the PMI and the RI. When the first measurement report contains no PMI, the data may be transmitted from the network node based on the RI.

According to a sixth aspect of the present disclosure, a terminal device is provided. The terminal device includes a receiving unit configured to receive a CSI-RS having a number, N, of ports transmitted from a network node using N beams, where N is an integer larger than one; and a transmitting unit configured to transmit to the network node a first measurement report containing an RI obtained by measuring the CSI-RS. The receiving unit is further configured to receive data transmitted from the network node based on the RI using the N beams.

According to a seventh aspect of the present disclosure, a terminal device is provided. The terminal device includes a transceiver, a processor and a memory. The memory contains instructions executable by the processor whereby the terminal device is operative to perform the method according to the above fifth aspect.

According to an eighth aspect of the present disclosure, a computer readable storage medium is provided. The computer readable storage medium has computer program instructions stored thereon. The computer program instructions, when executed by a processor in a terminal device, cause the terminal device to perform the method according to the above fifth aspect.

With the embodiments of the present disclosure, a network node can select N (N>1) beams for data transmission to a terminal device and transmit to the terminal device an N-port CSI-RS using the N beams. This allows the terminal device to obtain an RI by measuring the N-port CSI-RS and report the RI to the network node. Upon receiving the RI, the network node can transmit data to the terminal device based on the RI using the N beams. In this way, with the N-port CSI-RS, the network node can obtain the RI reported from the terminal device for the selected N beams in an efficient manner, and use the RI in transmitting data to the terminal device, so as to achieve improved throughput and/or flexibility in beam management.

BRIEF DESCRIPTION OF THE DRAWINGS

The above and other objects, features and advantages will be more apparent from the following description of embodiments with reference to the figures, in which:

FIGS. 10 to 13 are flowcharts illustrating methods implemented in a communication system including a host computer, a base station and a user equipment.

DETAILED DESCRIPTION

Figure 1:
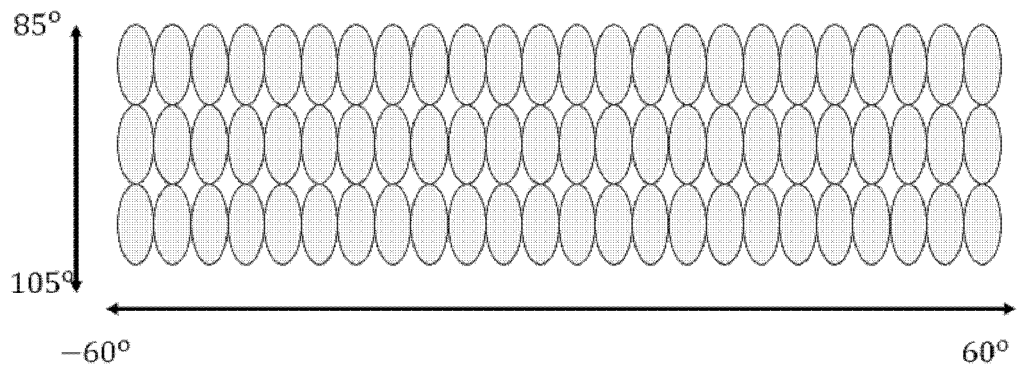
FIG. 1 is a schematic diagram showing an example of a GoB system.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction.

For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
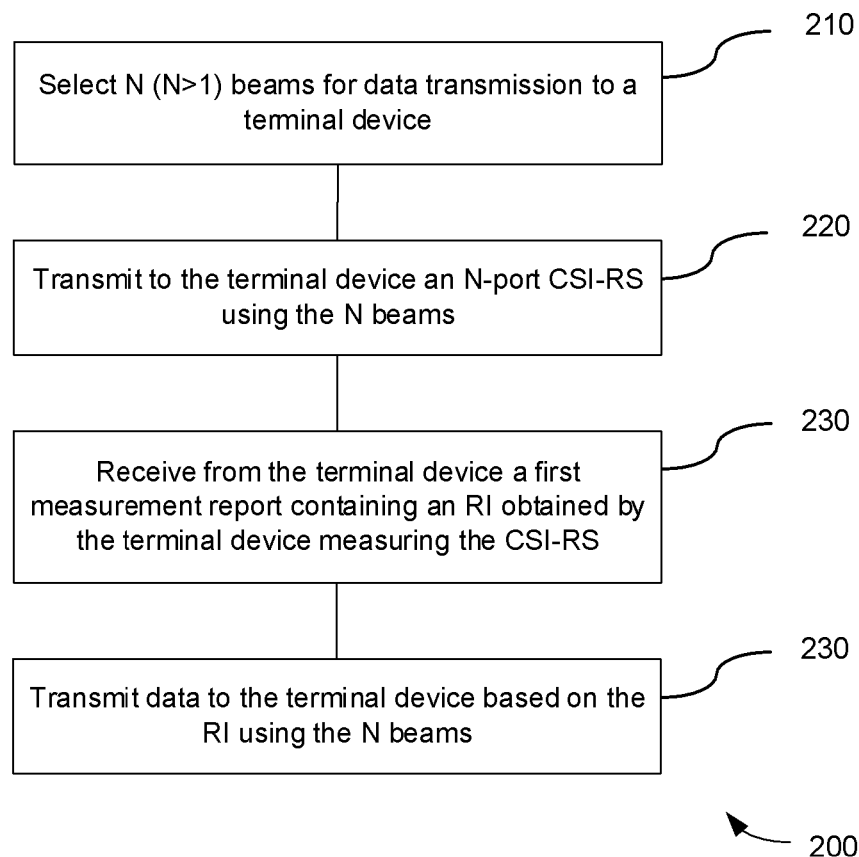
FIG. 2 is a flowchart illustrating a method in a network node according to an embodiment of the present disclosure.

FIG. 2 is a flowchart illustrating a method 200 according to an embodiment of the present disclosure. The method 200 can be performed in a network node, e.g., a gNB, for transmitting data using a GoB system.

At block 210, a number, N, of beams are selected for data transmission to a terminal device, where N is an integer larger than one.

In an example, e.g., prior to the block 210, the network node can transmit to the terminal device a number, M, of CSI-RSs each having one port (thus each of the M CSI-RSs can be referred to as 1-port CSI-RS) and being associated with one of M beams, where M is an integer and M≥N. The M 1-port CSI-RSs can be transmitted in one CSI-RS resource set. For example, before transmitting the M 1-port CSI-RSs, the network node can configure the terminal device to measure the M CSI-RSs in the CSI-RS resource set and report a number, m, of 1-port CSI-RSs having best signal qualities among the M 1-port CSI-RSs, without reporting PMI or RI, where m is an integer and can be e.g., 1, 2 or 4. Accordingly, the network node can receive from the terminal device a measurement report indicating m 1-port CSI-RSs having best signal qualities among the M 1-port CSI-RSs.

In an example, in the block 210, the N beams can be selected from the M beams based on the m 1-port CSI-RSs. For example, N may be equal to m and each of the N beams selected in the block 210 can be associated with one of the m 1-port CSI-RSs. As another example, a threshold can be defined and a beam can be selected only when its associated 1-port CSI-RS has a signal quality higher than the threshold. In other words, each of the N beams selected in the block 210 can be associated with one of the m 1-port CSI-RSs that has a signal quality higher than the threshold. In this case, N may be smaller than m when not all of the m 1-port CSI-RSs have their respective signal qualities higher than the threshold. For example, N may be 1, 2 or 4.

Alternatively, when each of the m 1-port CSI-RSs has a signal quality higher than the threshold, the network node can transmit to the terminal device M-m 1-port CSI-RSs obtained by removing the m 1-port CSI-RSs from the M 1-port CSI-RSs. Similarly, the M-m 1-port CSI-RSs can be transmitted in one CSI-RS resource set, and e.g., before transmitting the M-m 1-port CSI-RSs, the network node can configure the terminal device to measure the M-m 1-port CSI-RSs in the CSI-RS resource set and report k 1-port CSI-RSs having best signal qualities among the M-m 1-port CSI-RSs, without reporting PMI or RI. Then, the network node can receive from the terminal device a measurement report indicating k 1-port CSI-RSs having best signal qualities among the M-m 1-port CSI-RSs. Accordingly, in the block 210, m beams each associated with one of the m 1-port CSI-RSs and one or more beams each associated with one of the k 1-port CSI-RSs that has a signal quality higher than the threshold can be selected as the N beams. In this case, N may be larger than m. For example, N may be 1, 2, 4, 8, 16, or 32.

As an example, the signal quality as used herein may refer to RSRP.

In an example, in the block 210, the N beams can be selected based on a minimum allowable spatial or angular distance between any two beams for the data transmission. For example, in a GoB system, a difference between indices of two pre-defined beams may reflect the spatial or angular distance between them. In this case, e.g., when the measurement report from the terminal device indicates four beams having best RSRP as having beam indices of {0, 1, 2, 3}, N=2 and the minimum allowable difference between beam indices is 2, the network node can select e.g., beams {0, 2}, {1, 3} or {0, 3}.

In an example, the network node can further a number, P, of beams for data transmission to another terminal device, where P is an integer larger than one. Here, the N beams and the P beams can be selected based on a minimum allowable spatial or angular distance between any beam for the data transmission to the terminal device and any beam for the data transmission to the other terminal device. For example, when a measurement report from a terminal device, UE1, indicates four beams having best RSRP as having beam indices of {2, 6, 9, 11} and a measurement report from another terminal device, UE2, indicates four beams having best RSRP as having beam indices of {8, 10, 13, 17}, N=2, P=2 and the minimum allowable difference between beam indices for different terminal devices is 6, the network node can select beams {2, 6} for UE1 and beams {13, 17} for UE2.

At block 220, a CSI-RS having N ports (or referred to as an N-port CSI-RS) is transmitted to the terminal device using the N beams.

In an example, e.g., prior to the block 220, the network node can configure the terminal device to measure the N-port CSI-RS and report an RI (and optionally a PMI).

At block 230, a measurement report is received from the terminal device. The measurement report contains an RI obtained by the terminal device measuring the N-port CSI-RS.

At block 240, data is transmitted to the terminal device based on the RI using the N beams.

In an example, when the measurement report received in the block 230 contains a PMI, the data can be transmitted in the block 240 with a precoding matrix based on the PMI and the RI. For example, assuming that the network node has 64 transmission antennas and RI=2, a two-layer data transmission can be performed according to:

$$Y = W^{P2A} W^{PMI} X \qquad (1)$$

where Y denotes a signal to be transmitted, $W^{P2A}$ is a 64*N matrix denoting a P2A mapping weight of the N selected beams, $W^{PMI}$ is an N*2 precoding matrix determined based on the PMI and RI, and X is a 2*1 vector denoting the data (information) to be transmitted.

In another example, when the measurement report received in the block 230 contains no PMI, the data can be transmitted in the block 240 based on the RI. For example, assuming that the network node has 64 transmission antennas and RI=2, a two-layer data transmission can be performed according to:

$$Y = W^{P2A} CX \qquad (2)$$

where Y denotes a signal to be transmitted, $W^{P2A}$ is a 64*N matrix denoting a P2A mapping weight of the N selected beams, C is an N*2 matrix constructed based on a 2*2 identity matrix (e.g., when N=2, C can be a 2*2 identity matrix or can be simply omitted; or when N>2, C can be a matrix having the first two rows being a 2*2 identity matrix and all other elements being 0), and X is a 2*1 vector denoting the data (information) to be transmitted.

Figure 3:
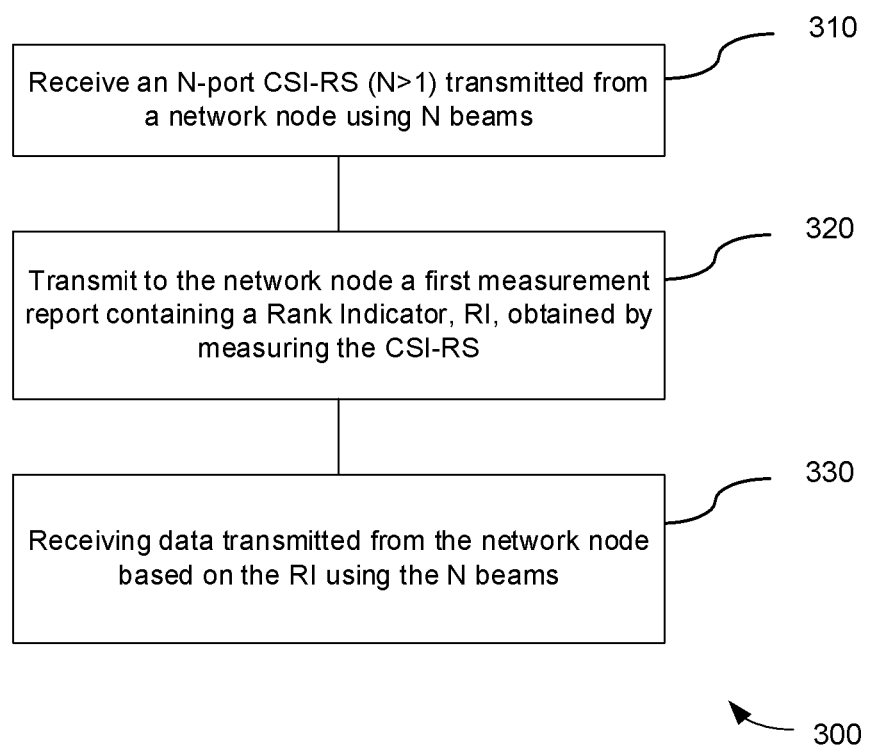
FIG. 3 is a flowchart illustrating a method in a terminal device according to another embodiment of the present disclosure.

FIG. 3 is a flowchart illustrating a method 300 according to an embodiment of the present disclosure. The method 300 can be performed in a terminal device, e.g., a UE, for receiving data using a GoB system.

At block 310, a CSI-RS having a number, N, of ports (or referred to as an N-port CSI-RS) transmitted from a network node using N beams is received, where N is an integer larger than one.

In an example, e.g., prior to the block 310, the terminal device can receive from the network node a configuration signal for configuring the terminal device to: measure the CSI-RS and report the RI or report the RI (and optionally a PMI).

In an example, e.g., prior to the block 310, the terminal device can receive from the network node a number, M, of CSI-RSs each having one port ((thus each of the M CSI-RSs can be referred to as 1-port CSI-RS) and being associated with one of M beams, where M is an integer and M≥N. Here, the M CSI-RSs can be received in one CSI-RS resource set, and before receiving the M 1-port CSI-RSs, the terminal device can receive from the network node a configuration signal for configuring the terminal device to measure the M 1-port CSI-RSs in the CSI-RS resource set and report the a number, m, of 1-port CSI-RSs having best signal qualities among the M 1-port CSI-RSs, without reporting PMI or RI, where m is an integer. The terminal device can then transmit to the network node a measurement report indicating m 1-port CSI-RSs having best signal qualities among the M 1-port CSI-RSs. Next, optionally, the terminal device may receive from the network node M-m 1-port CSI-RSs obtained by removing them 1-port CSI-RSs from the M 1-port CSI-RSs. Here, the M-m 1-port CSI-RSs can be received in one CSI-RS resource set, and before receiving the M-m 1-port CSI-RSs, the terminal device can receive from the network node a configuration signal for configuring the terminal device to measure the M-m CSI-RSs and report a number, k, of 1-port CSI-RSs having best signal qualities among the M-m 1-port CSI-RSs, without reporting PMI or RI, where k is an integer. The terminal device can then transmit to the network node a measurement report indicating k 1-port CSI-RSs having best signal qualities among the M-m 1-port CSI-RSs.

As an example, the signal quality as used herein may refer to RSRP.

At block 320, a measurement report is transmitted to the network node. The measurement report contains an RI obtained by measuring the N-port CSI-RS.

At block 330, data transmitted from the network node based on the RI using the N beams is received.

In an example, when the measurement report transmitted in the block 320 contains a PMI, the data received in the block 330 can be transmitted from the network node with a precoding matrix based on the PMI and the RI, e.g., according to the above Equation (1). When the measurement report transmitted in the block 320 contains no PMI, the data received in the block 330 can be transmitted from the network node based on the RI, e.g., according to the above Equation (2).

Figure 4:
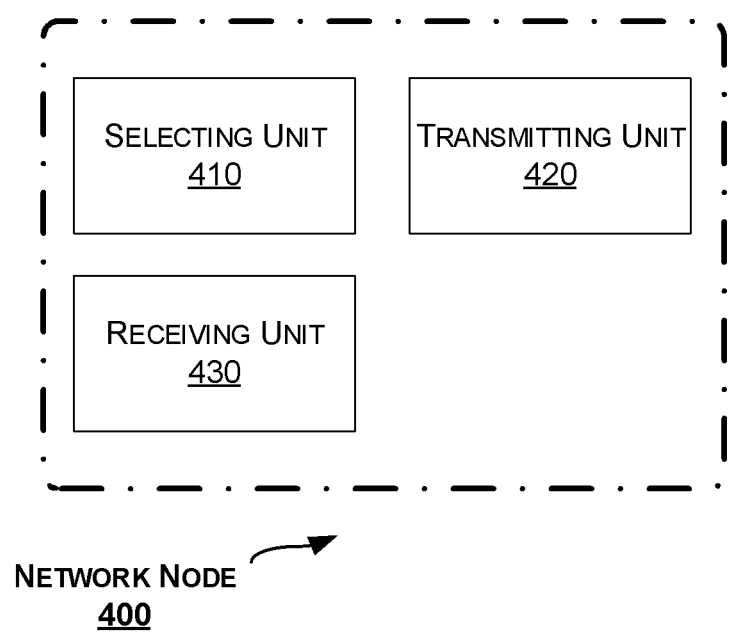
FIG. 4 is a block diagram of a network node according to an embodiment of the present disclosure.

Correspondingly to the method 200 as described above, a network node is provided. FIG. 4 is a block diagram of a network node 400 according to an embodiment of the present disclosure.

As shown in FIG. 4, the network node 400 includes a selecting unit 410 configured to select a number, N, of beams for data transmission to a terminal device, where N is an integer larger than one. The network node 400 further includes a transmitting unit 420 configured to transmit to the terminal device a CSI-RS having N ports using the N beams. The network node 400 further includes a receiving unit 430 configured to receive from the terminal device a first measurement report containing an RI obtained by the terminal device measuring the CSI-RS. The transmitting unit 420 can be further configured to transmit data to the terminal device based on the RI using the N beams.

In an embodiment, the network node 400 may further include a configuring unit configured to configure the terminal device to: measure the CSI-RS, and report the RI or report the RI and a PMI.

In an embodiment, the transmitting unit 420 can be further configured to transmit to the terminal device a number, M, of CSI-RSs each having one port and being associated with one of M beams, where M is an integer and M N. The receiving unit 430 can be configured to receive from the terminal device a second measurement report indicating a number, m, of CSI-RSs having best signal qualities among the M CSI-RSs, where m is an integer.

In an embodiment, the selecting unit 410 can be configured to select the N beams from the M beams based on the m CSI-RSs.

In an embodiment, the selecting unit 410 can be configured to select the N beams each associated with one of the m CSI-RSs that has a signal quality higher than a threshold.

In an embodiment, the M CSI-RSs can be transmitted in one CSI-RS resource set. The configuring unit can be further configured to configure the terminal device to measure the M CSI-RSs and report the m CSI-RSs having best signal qualities among the M CSI-RSs, without reporting PMI or RI.

In an embodiment, the transmitting unit 420 can be further configured to transmit, when each of the m CSI-RSs has a signal quality higher than a threshold, to the terminal device M-m CSI-RSs obtained by removing the m CSI-RSs from the M CSI-RSs. The receiving unit 430 can be further configured to receive from the terminal device a third measurement report indicating a number, k, of CSI-RSs having best signal qualities among the M-m CSI-RSs, where k is an integer. The selecting unit 410 can be configured to select, as the N beams, m beams each associated with one of the m CSI-RSs and one or more beams each associated with one of the k CSI-RSs that has a signal quality higher than the threshold.

In an embodiment, the M-m CSI-RSs can be transmitted in one CSI-RS resource set. The configuring unit can be further configured to configure the terminal device to measure the M-m CSI-RSs and report the k CSI-RSs having best signal qualities among the M-m CSI-RSs, without reporting PMI or RI.

In an embodiment, the signal quality may include RSRP.

In an embodiment, the N beams may be selected based on a minimum allowable spatial or angular distance between any two beams for the data transmission.

In an embodiment, the transmitting unit 420 can be configured to transmit, when the first measurement report further contains a PMI, the data with a precoding matrix based on the PMI and the RI, or transmit, when the first measurement report contains no PMI, the data based on the RI.

In an embodiment, the selecting unit 410 can be further configured to select a number, P, of beams for data transmission to another terminal device, where P is an integer larger than one. The N beams and the P beams may be selected based on a minimum allowable spatial or angular distance between any beam for the data transmission to the terminal device and any beam for the data transmission to the other terminal device.

The selecting unit 410, the transmitting unit 420 and the receiving unit 430 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 5:
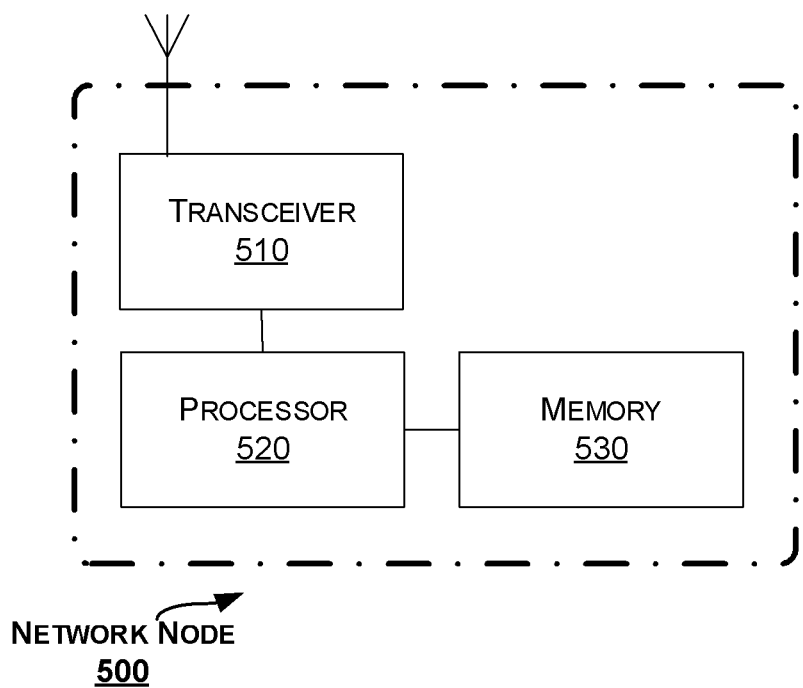
FIG. 5 is a block diagram of a network node according to another embodiment of the present disclosure.

FIG. 5 is a block diagram of a network node 500 according to another embodiment of the present disclosure.

The network node 500 includes a transceiver 510, a processor 520 and a memory 530. The memory 530 contains instructions executable by the processor 520 whereby the network node 500 is operative to perform the actions, e.g., of the procedure described earlier in conjunction with FIG. 2. Particularly, the memory 530 contains instructions executable by the processor 520 whereby the network node 500 is operative to: select a number, N, of beams for data transmission to a terminal device, where N is an integer larger than one; transmit to the terminal device a CSI-RS having N ports using the N beams; receive from the terminal device a first measurement report containing an RI obtained by the terminal device measuring the CSI-RS; and transmit data to the terminal device based on the RI using the N beams.

In an embodiment, the memory 530 may further contain instructions executable by the processor 520 whereby the network node 500 is operative to: configure the terminal device to: measure the CSI-RS, and report the RI or report the RI and a PMI.

In an embodiment, the memory 530 may further contain instructions executable by the processor 520 whereby the network node 500 is operative to: transmit to the terminal device a number, M, of CSI-RSs each having one port and being associated with one of M beams, where M is an integer and M N; and receive from the terminal device a second measurement report indicating a number, m, of CSI-RSs having best signal qualities among the M CSI-RSs, where m is an integer.

In an embodiment, the above operation of selecting may include: selecting the N beams from the M beams based on the m CSI-RSs.

In an embodiment, the above operation of selecting may include: selecting the N beams each associated with one of the m CSI-RSs that has a signal quality higher than a threshold.

In an embodiment, the M CSI-RSs can be transmitted in one CSI-RS resource set. The memory 530 may further contain instructions executable by the processor 520 whereby the network node 500 is operative to: configure the terminal device to measure the M CSI-RSs and report the m CSI-RSs having best signal qualities among the M CSI-RSs, without reporting PMI or RI.

In an embodiment, the memory 530 may further contain instructions executable by the processor 520 whereby the network node 500 is operative to: transmit, when each of the m CSI-RSs has a signal quality higher than a threshold, to the terminal device M-m CSI-RSs obtained by removing the m CSI-RSs from the M CSI-RSs; and receive from the terminal device a third measurement report indicating a number, k, of CSI-RSs having best signal qualities among the M-m CSI-RSs, where k is an integer. The above operation of selecting may include: selecting, as the N beams, m beams each associated with one of the m CSI-RSs and one or more beams each associated with one of the k CSI-RSs that has a signal quality higher than the threshold.

In an embodiment, the M-m CSI-RSs can be transmitted in one CSI-RS resource set. The memory 530 may further contain instructions executable by the processor 520 whereby the network node 500 is operative to: configure the terminal device to measure the M-m CSI-RSs and report the k CSI-RSs having best signal qualities among the M-m CSI-RSs, without reporting PMI or RI.

In an embodiment, the signal quality may include RSRP.

In an embodiment, the N beams may be selected based on a minimum allowable spatial or angular distance between any two beams for the data transmission.

In an embodiment, the above operation of transmitting may include: transmitting, when the first measurement report further contains a PMI, the data with a precoding matrix based on the PMI and the RI, or transmitting, when the first measurement report contains no PMI, the data based on the RI.

In an embodiment, the memory 530 may further contain instructions executable by the processor 520 whereby the network node 500 is operative to: select a number, P, of beams for data transmission to another terminal device, where P is an integer larger than one. The N beams and the P beams may be selected based on a minimum allowable spatial or angular distance between any beam for the data transmission to the terminal device and any beam for the data transmission to the other terminal device.

Figure 6:
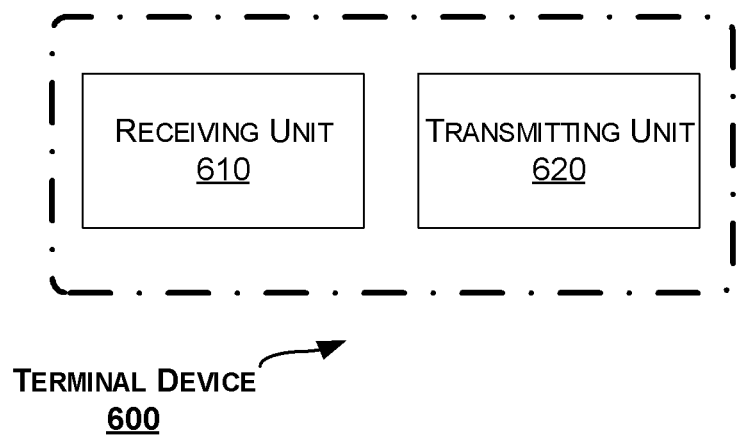
FIG. 6 is a block diagram of a terminal device according to another embodiment of the present disclosure.

Correspondingly to the method 300 as described above, a terminal device is provided. FIG. 6 is a block diagram of a terminal device 600 according to an embodiment of the present disclosure.

As shown in FIG. 6, the terminal device 600 includes a receiving unit 610 configured to receive a CSI-RS having a number, N, of ports transmitted from a network node using N beams, where N is an integer larger than one. The terminal device 600 further includes a transmitting unit 620 configured to transmit to the network node a first measurement report containing an RI obtained by measuring the CSI-RS. The receiving unit 610 is further configured to receive data transmitted from the network node based on the RI using the N beams.

In an embodiment, the receiving unit 610 can be further configured to receive from the network node a first configuration signal for configuring the terminal device to: measure the CSI-RS, and report the RI or report the RI and a PMI.

In an embodiment, the receiving unit 610 can be further configured to receive from the network node a number, M, of CSI-RSs each having one port and being associated with one of M beams, where M is an integer and M N. The transmitting unit 620 can be further configured to transmit to the network node a second measurement report indicating a number, m, of CSI-RSs having best signal qualities among the M CSI-RSs, where m is an integer.

In an embodiment, the M CSI-RSs may be received in one CSI-RS resource set. The receiving unit 610 can be further configured to receive from the network node a second configuration signal for configuring the terminal device to measure the M CSI-RSs and report the m CSI-RSs having best signal qualities among the M CSI-RSs, without reporting PMI or RI.

In an embodiment, the receiving unit 610 can be further configured to receive from the network node M-m CSI-RSs obtained by removing the m CSI-RSs from the M CSI-RSs. The transmitting unit 620 can be further configured to transmit to the network node a third measurement report indicating a number, k, of CSI-RSs having best signal qualities among the M-m CSI-RSs, where k is an integer.

In an embodiment, the M-m CSI-RSs may be received in one CSI-RS resource set. The receiving unit 610 can be further configured to receive from the network node a third configuration signal for configuring the terminal device to measure the M-m CSI-RSs and report the k CSI-RSs having best signal qualities among the M-m CSI-RSs, without reporting PMI or RI.

In an embodiment, the signal quality may include RSRP.

In an embodiment, when the first measurement report further contains a PMI, the data may be transmitted from the network node with a precoding matrix based on the PMI and the RI. When the first measurement report contains no PMI, the data may be transmitted from the network node based on the RI.

The receiving unit 610 and the transmitting unit 620 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 7:
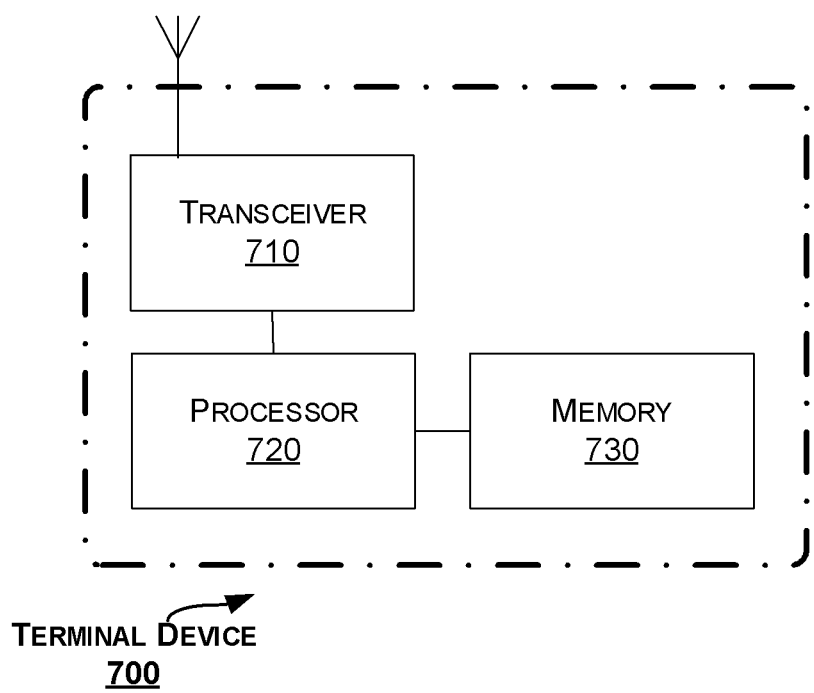
FIG. 7 is a block diagram of a terminal device according to another embodiment of the present disclosure.

FIG. 7 is a block diagram of a terminal device 700 according to another embodiment of the present disclosure.

The terminal device 700 includes a transceiver 710, a processor 720 and a memory 730. The memory 730 contains instructions executable by the processor 720 whereby the terminal device 700 is operative to perform the actions, e.g., of the procedure described earlier in conjunction with FIG. 3. Particularly, the memory 730 contains instructions executable by the processor 720 whereby the terminal device 700 is operative to: receive a CSI-RS having a number, N, of ports transmitted from a network node using N beams, where N is an integer larger than one; transmit to the network node a first measurement report containing an RI obtained by measuring the CSI-RS; and receive data transmitted from the network node based on the RI using the N beams.

In an embodiment, the memory 730 may further contain instructions executable by the processor 720 whereby the terminal device 700 is operative to: receive from the network node a first configuration signal for configuring the terminal device to: measure the CSI-RS, and report the RI or report the RI and a PMI.

In an embodiment, the memory 730 may further contain instructions executable by the processor 720 whereby the terminal device 700 is operative to: receive from the network node a number, M, of CSI-RSs each having one port and being associated with one of M beams, where M is an integer and M N; and transmit to the network node a second measurement report indicating a number, m, of CSI-RSs having best signal qualities among the M CSI-RSs, where m is an integer.

In an embodiment, the M CSI-RSs may be received in one CSI-RS resource set. The memory 730 may further contain instructions executable by the processor 720 whereby the terminal device 700 is operative to: receive from the network node a second configuration signal for configuring the terminal device to measure the M CSI-RSs and report the m CSI-RSs having best signal qualities among the M CSI-RSs, without reporting PMI or RI.

In an embodiment, the memory 730 may further contain instructions executable by the processor 720 whereby the terminal device 700 is operative to: receive from the network node M-m CSI-RSs obtained by removing the m CSI-RSs from the M CSI-RSs; and transmit to the network node a third measurement report indicating a number, k, of CSI-RSs having best signal qualities among the M-m CSI-RSs, where k is an integer.

In an embodiment, the M-m CSI-RSs may be received in one CSI-RS resource set. The memory 730 may further contain instructions executable by the processor 720 whereby the terminal device 700 is operative to: receive from the network node a third configuration signal for configuring the terminal device to measure the M-m CSI-RSs and report the k CSI-RSs having best signal qualities among the M-m CSI-RSs, without reporting PMI or RI.

In an embodiment, the signal quality may include RSRP.

In an embodiment, when the first measurement report further contains a PMI, the data may be transmitted from the network node with a precoding matrix based on the PMI and the RI. When the first measurement report contains no PMI, the data may be transmitted from the network node based on the RI.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 520 causes the network node 500 to perform the actions, e.g., of the procedure described earlier in conjunction with FIG. 2; or code/computer readable instructions, which when executed by the processor 720 causes the terminal device 700 to perform the actions, e.g., of the procedure described earlier in conjunction with FIG. 3.

The computer program product may be configured as a computer program code structured in computer program modules. The computer program modules could essentially perform the actions of the flow illustrated in FIG. 2 or 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 8:
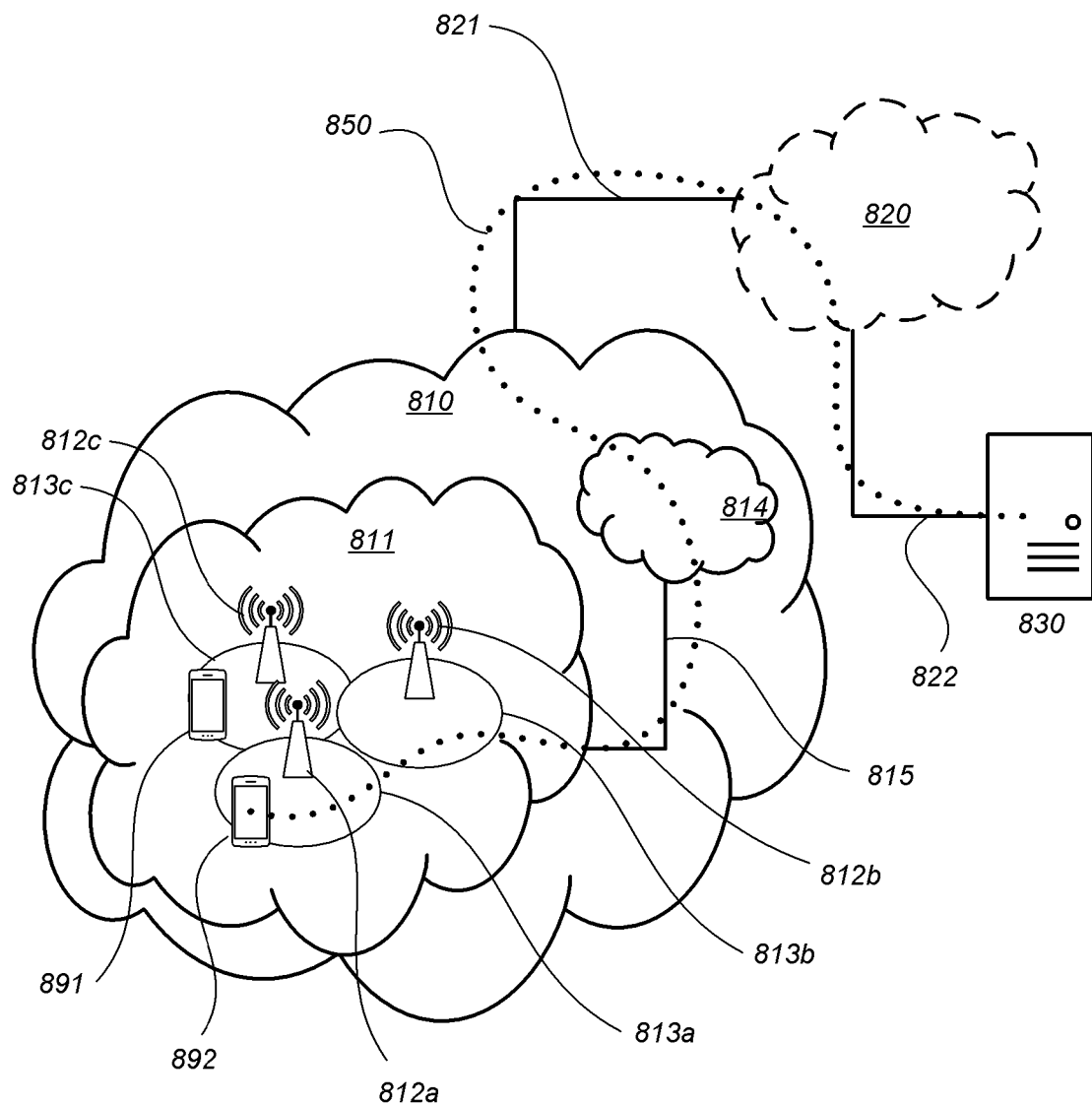
FIG. 8 schematically illustrates a telecommunication network connected via an intermediate network to a host computer.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812*a*, 812*b*, 812*c*, such as NBs, eNBs, gNBs or other types of wireless access points, each defining a corresponding coverage area 813*a*, 813*b*, 813*c*. Each base station 812*a*, 812*b*, 812*c* is connectable to the core network 814 over a wired or wireless connection 815. A first UE 891 located in a coverage area 813*c* is configured to wirelessly connect to, or be paged by, the corresponding base station 812*c*. A second UE 892 in a coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
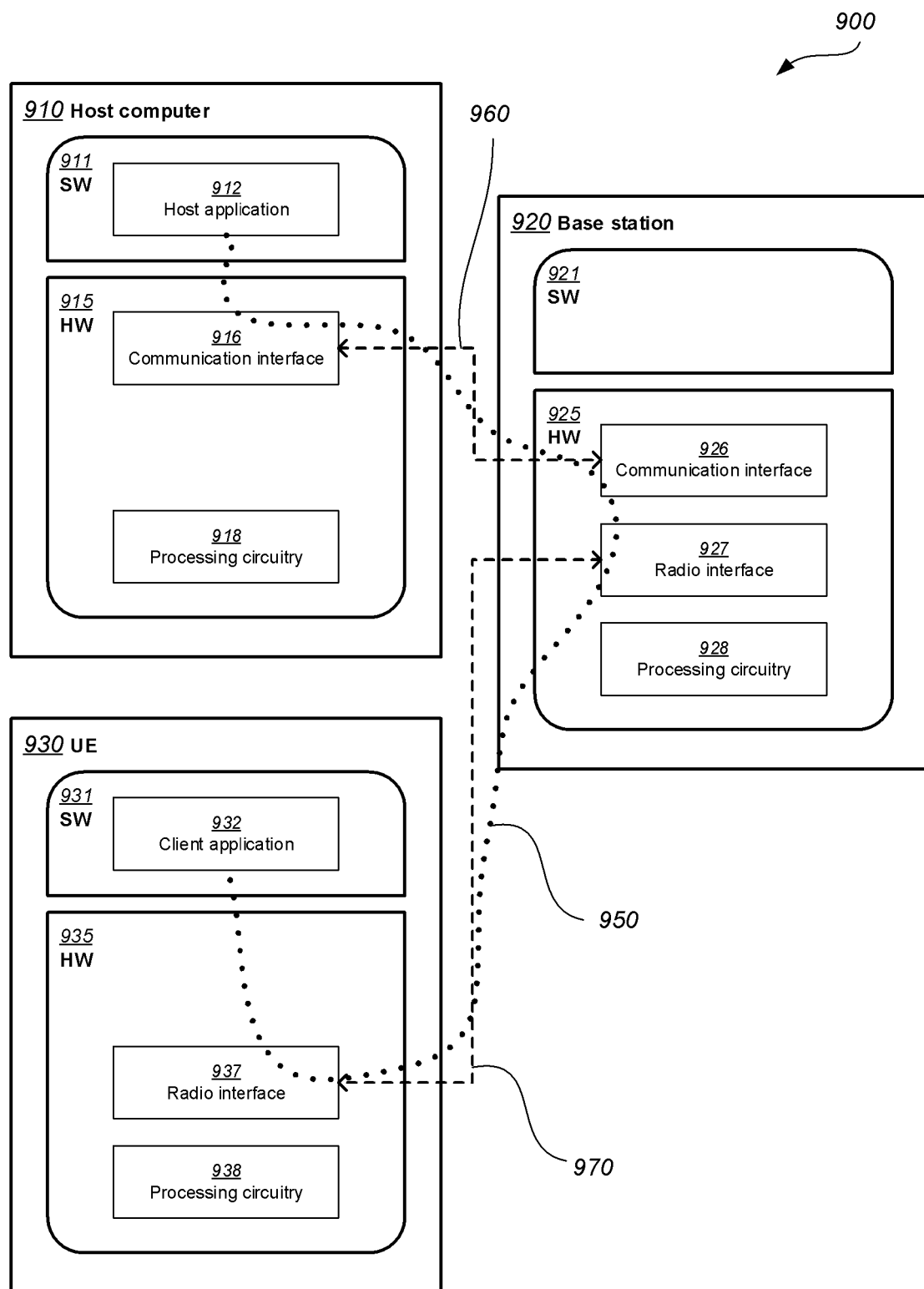
FIG. 9 is a generalized block diagram of a host computer communicating via a base station with a user equipment over a partially wireless connection.

It is noted that the host computer 910, the base station 920 and the UE 930 illustrated in FIG. 9 may be similar or identical to the host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve data throughput and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

FIG. 10 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 11 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

FIG. 12 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network node, comprising:
  transmitting to a terminal device a number, M, of channel state information reference signals (CSI-RSs), each having one port and being associated with one of M beams, where M is an integer; and
  receiving from the terminal device a first measurement report indicating a number, m, of CSI-RSs having best signal qualities among the M CSI-RSs, where m is an integer;
  transmitting, when each of the m CSI-RSs has a signal quality higher than a threshold, to the terminal device M-m CSI-RSs obtained by removing the m CSI-RSs from the M CSI-RSs; and
  receiving from the terminal device a second measurement report indicating a number, k, of CSI-RSs having best signal qualities among the M-m CSI-RSs, where k is an integer;
  selecting a number, N, of beams for data transmission to a terminal device, where N is an integer larger than one and M≥N, wherein said selecting comprises selecting, as the N beams, m beams each associated with one of the m CSI-RSs and one or more beams each associated with one of the k CSI-RSs that has a signal quality higher than the threshold;
  transmitting to the terminal device a CSI-RS having N ports, using the N beams;
  receiving from the terminal device a third measurement report containing a rank indicator (RI) obtained by the terminal device measuring the CSI-RS; and
  transmitting data to the terminal device based on the RI using the N beams.

2. The method of claim 1, further comprising:
  configuring the terminal device to:
    measure the CSI-RS, and
    report the RI or report the RI and a precoding matrix index (PMI).

3. The method of claim 1, wherein the M CSI-RSs are transmitted in one CSI-RS resource set, and wherein the method further comprises:
  configuring the terminal device to measure the M CSI-RSs and report the m CSI-RSs having best signal qualities among the M CSI-RSs, without reporting PMI or rank indicator (RI).

4. The method of claim 1, wherein the M-m CSI-RSs are transmitted in one CSI-RS resource set, and wherein the method further comprises:
  configuring the terminal device to measure the M-m CSI-RSs and report the k CSI-RSs having best signal qualities among the M-m CSI-RSs, without reporting PMI or RI.

5. The method of claim 1, wherein the signal quality comprises Reference Signal Received Power (RSRP).

6. The method of claim 1, wherein the N beams are selected based on a minimum allowable spatial or angular distance between any two beams for the data transmission.

7. The method of claim 1, wherein said transmitting comprises:
  transmitting, when the third measurement report further contains a PMI, the data with a precoding matrix based on the PMI and the RI, or
  transmitting, when the third measurement report contains no PMI, the data based on the RI.

8. A method in a terminal device, comprising:
  receiving from the network node a number, M, of channel state information reference signals (CSI-RSs), each having one port and being associated with one of M beams, where M is an integer; and
  transmitting to the network node a first measurement report indicating a number, m, of CSI-RSs having best signal qualities among the M CSI-RSs, where m is an integer;
  receiving from the network node M-m CSI-RSs obtained by removing the m CSI-RSs from the M CSI-RSs; and
  transmitting to the network node a second measurement report indicating a number, k, of CSI-RSs having best signal qualities among the M-m CSI-RSs, where k is an integer;
  receiving a CSI-RS having a number, N, of ports transmitted from a network node using N beams, where N is an integer larger than one and M≥N;
  transmitting to the network node a third measurement report containing a rank indicator (RI) obtained by measuring the CSI-RS; and
  receiving data transmitted from the network node based on the RI using the N beams.

9. The method of claim 8, further comprising:
  receiving from the network node a first configuration signal for configuring the terminal device to:
    measure the CSI-RS, and
    report the RI or report the RI and a precoding matrix index (PMI).

10. The method of claim 8, wherein the M CSI-RSs are received in one CSI-RS resource set, and wherein the method further comprises:
  receiving from the network node a second configuration signal for configuring the terminal device to measure the M CSI-RSs and report the m CSI-RSs having best signal qualities among the M CSI-RSs, without reporting PMI or RI.

11. The method of claim 8 wherein the M-m CSI-RSs are received in one CSI-RS resource set, and wherein the method further comprises:
  receiving from the network node a third configuration signal for configuring the terminal device to measure the M-m CSI-RSs and report the k CSI-RSs having best signal qualities among the M-m CSI-RSs, without reporting PMI or RI.

12. The method of claim 8, wherein the signal quality comprises Reference Signal Received Power (RSRP).

13. The method of claim 8, wherein
  when the third measurement report contains a PMI, the data is transmitted from the network node with a precoding matrix based on the PMI and the RI, or
  when the third measurement report contains no PMI, the data is transmitted from the network node based on the RI.

14. A terminal device, comprising a transceiver, a processor and a memory, the memory comprising instructions executable by the processor whereby the terminal device is operative to:
  receive from the network node a number, M, of channel state information reference signals (CSI-RSs), each having one port and being associated with one of M beams, where M is an integer; and
  transmit to the network node a first measurement report indicating a number, m, of CSI-RSs having best signal qualities among the M CSI-RSs, where m is an integer;
  receive from the network node M-m CSI-RSs obtained by removing the m CSI-RSs from the M CSI-RSs; and
  transmit to the network node a second measurement report indicating a number, k, of CSI-RSs having best signal qualities among the M-m CSI-RSs, where k is an integer;
  receive a CSI-RS having a number, N, of ports transmitted from a network node using N beams, where N is an integer larger than one and M≥N;
  transmit to the network node a third measurement report containing a rank indicator (RI) obtained by measuring the CSI-RS; and
  receive data transmitted from the network node based on the RI using the N beams.

* * * * *